(12) United States Patent
Nett

(10) Patent No.: US 10,899,498 B1
(45) Date of Patent: Jan. 26, 2021

(54) INTERLOCKING PALLET RACK FOOT PLATE

(71) Applicant: Tubal-Cain Nett, Milwaukee, WI (US)

(72) Inventor: Tubal-Cain Nett, Milwaukee, WI (US)

( * ) Notice: Subject to any disclaimer, the term of this patent is extended or adjusted under 35 U.S.C. 154(b) by 0 days.

(21) Appl. No.: 16/990,005

(22) Filed: Aug. 11, 2020

(51) Int. Cl.
*B65D 19/00* (2006.01)
*B65D 19/38* (2006.01)

(52) U.S. Cl.
CPC .... *B65D 19/385* (2013.01); *B65D 2519/0096* (2013.01); *B65D 2519/00323* (2013.01)

(58) Field of Classification Search
CPC .... A47L 365/10; A47L 365/15; A47L 365/20; B65D 19/385; B65D 2519/00323; B65D 2519/0096
See application file for complete search history.

(56) References Cited

U.S. PATENT DOCUMENTS

| 850,977 | A | * | 4/1907 | Smith | A47B 65/20 211/43 |
|---|---|---|---|---|---|
| 1,557,419 | A | * | 10/1925 | Clarke | A47B 65/00 211/43 |
| 1,598,467 | A | * | 8/1926 | Weeks | A47B 65/20 211/43 |
| 1,832,884 | A | * | 11/1931 | Ulrich | A47B 65/20 211/43 |
| 3,056,526 | A | * | 10/1962 | Harris | B65D 19/385 206/511 |
| 3,095,837 | A | * | 7/1963 | Skubic | B65D 19/385 108/53.5 |
| 3,168,060 | A | * | 2/1965 | Farley | B65D 19/385 108/53.5 |
| 3,249,072 | A | * | 5/1966 | Skubic | B65D 19/385 108/53.5 |
| 3,653,735 | A | * | 4/1972 | Duepree | A47B 88/417 312/330.1 |
| 3,784,021 | A | * | 1/1974 | Mark | A47B 63/00 211/43 |
| 5,183,163 | A | * | 2/1993 | Slaiken | A47B 65/20 211/43 |
| 6,334,539 | B1 | * | 1/2002 | Jajko | A47B 65/00 211/42 |
| 9,931,988 | B2 | * | 4/2018 | Culleton | B60R 7/02 |
| 2019/0136505 | A1 | * | 5/2019 | Bedel | F16B 12/48 |

* cited by examiner

*Primary Examiner* — Matthew W Ing
(74) *Attorney, Agent, or Firm* — Donald J. Ersler

(57) ABSTRACT

An interlocking pallet rack foot plate preferably includes an attachment flange, a bottom flange and an offset junction. The bottom flange extends from one end of the offset junction flange. The attachment flange extends perpendicular from an opposing end of the offset junction, relative to the bottom flange. At least one pillar hole is formed through the attachment flange. At least one floor hole is formed through an end of the bottom flange. A first plurality of interlocking projections are formed on one edge of the bottom flange and a second plurality of interlocking projections are formed on an opposing edge of the bottom flange. Each projection includes a peak and a valley. Thus, two adjacent interlocking pallet rack foot plates will interlock. The alignment of adjacent bottom plates allows a plurality of vertical pillars of the plurality of pallet racks to contact each other when bundled.

17 Claims, 6 Drawing Sheets

INTERLOCKING PALLET RACK FOOT PLATE

BACKGROUND OF THE INVENTION

1. Field of the Invention

The present invention relates generally to warehousing and more specifically to an interlocking pallet rack foot plate, which is attached to a bottom of a vertical pillar of a pallet rack to prevent multiple bundled pallet racks from shifting relative to each other during transport.

2. Discussion of the Prior Art

It appears that the prior art does not teach or suggest an interlocking pallet rack foot plate.

Accordingly, there is a clearly felt need in the art for an interlocking pallet rack foot plate, which is attached to a bottom of a vertical pillar of a pallet rack to prevent multiple bundled pallet racks from shifting relative to each other during transport.

SUMMARY OF THE INVENTION

The present invention provides an interlocking pallet rack foot plate, which is attached to a bottom of a vertical pillar of a pallet rack. The interlocking pallet rack foot plate preferably includes an attachment flange, a bottom flange and an offset junction. The interlocking pallet rack foot plate is preferably fabricated from a single piece of material. The bottom flange extends from one end of the offset junction flange. The attachment flange extends perpendicular from an opposing end of the offset junction, relative to the bottom flange. The offset junction avoids making contact with a bottom corner of the vertical pillar of a pallet rack. At least one pillar hole is formed through the attachment flange, such that the interlocking pallet rack foot plate may be secured to the vertical pillar with at least one pillar fastener. However, the attachment flange may also be welded to the vertical pillar eliminating the need for the at least one pillar hole and the at least one fastener. At least one floor hole is formed through an end of the bottom flange, such that the pallet rack may be secured to a warehouse floor with at least one floor fastener.

A first plurality of interlocking projections are formed on one edge of the bottom flange and a second plurality of interlocking projections are formed on an opposing edge of the bottom flange. Each projection includes a peak and a valley. The first plurality of interlocking projections starts, adjacent the attachment plate with a peak. The second plurality of interlocking projections starts, adjacent the attachment plate with a valley. Thus, two adjacent interlocking pallet rack foot plates will interlock and all edges are aligned with each other. Further, a transition line between the plurality of peaks and valleys will be an edge of the vertical pillar. The alignment of the transition line allows a plurality of vertical pillars of the plurality of pallet racks to contact each other when bundled.

Accordingly, it is an object of the present invention to provide a pallet rack foot plate, which is attached to a bottom of a vertical pillar of a pallet rack to prevent multiple bundled pallet racks from shifting relative to each other during transport.

These and additional objects, advantages, features and benefits of the present invention will become apparent from the following specification.

DETAILED DESCRIPTION OF THE PREFERRED EMBODIMENTS

Figure 1:
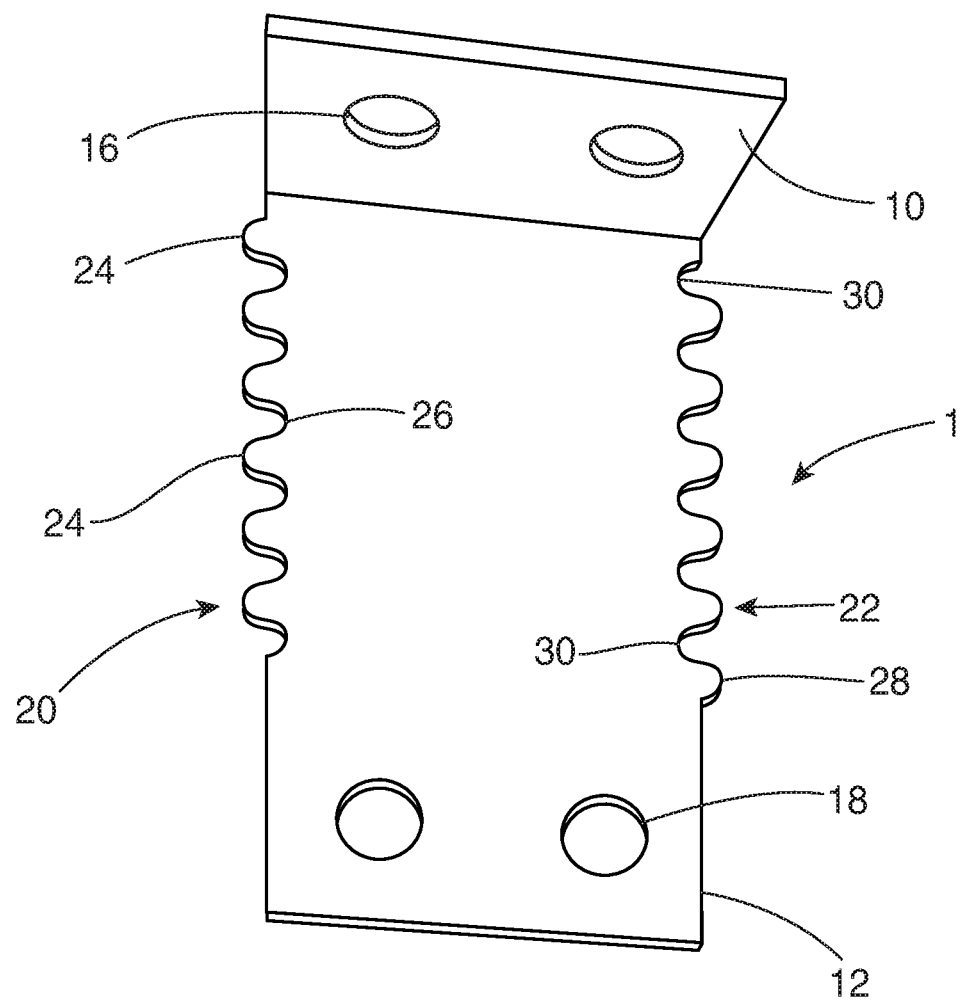
FIG. 1 is a perspective view of an interlocking pallet rack foot plate in accordance with the present invention.
Figure 2:
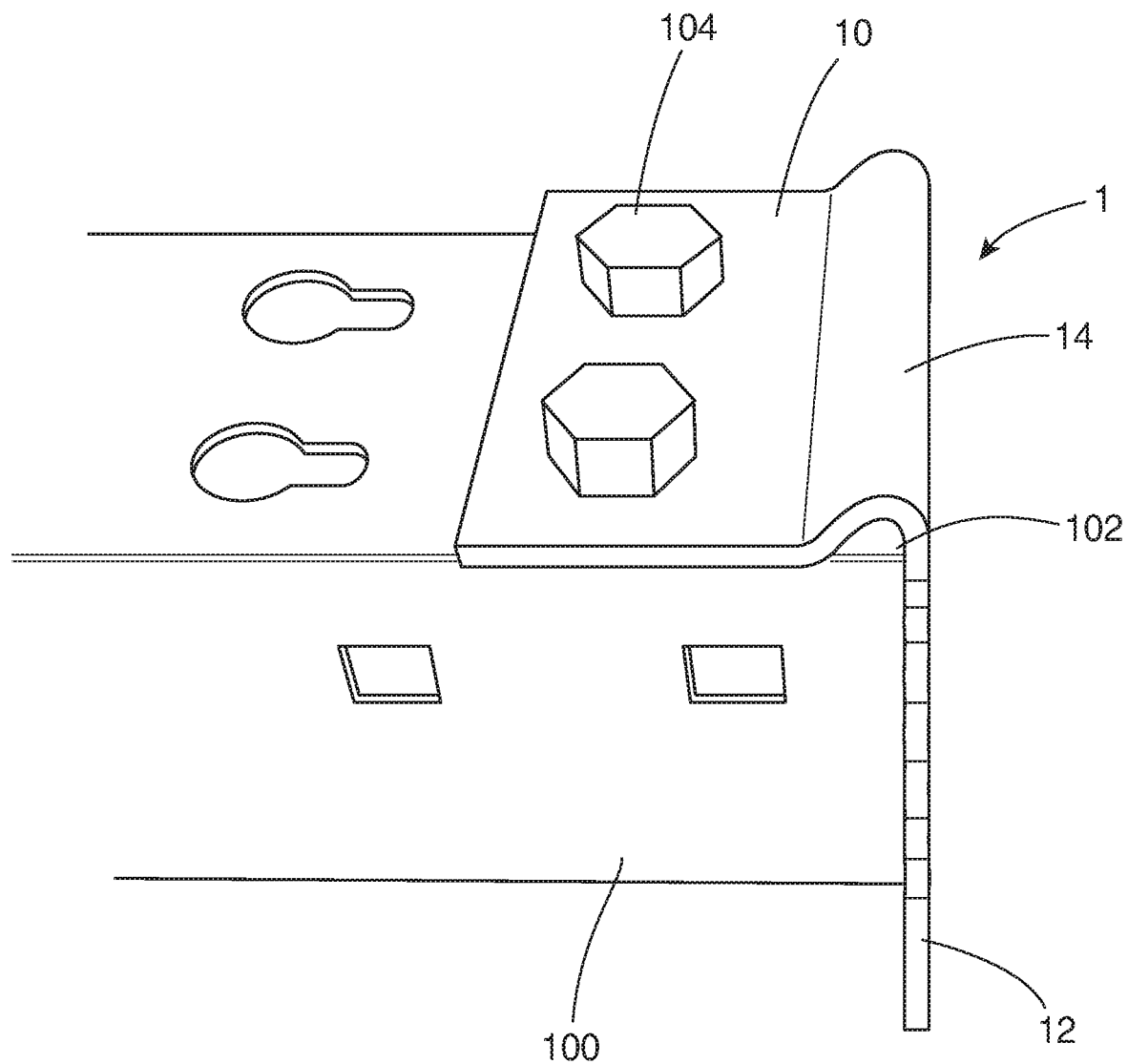
FIG. 2 is a top end perspective view of an interlocking pallet rack foot plate attached to a pallet rack in accordance with the present invention.
Figure 3:
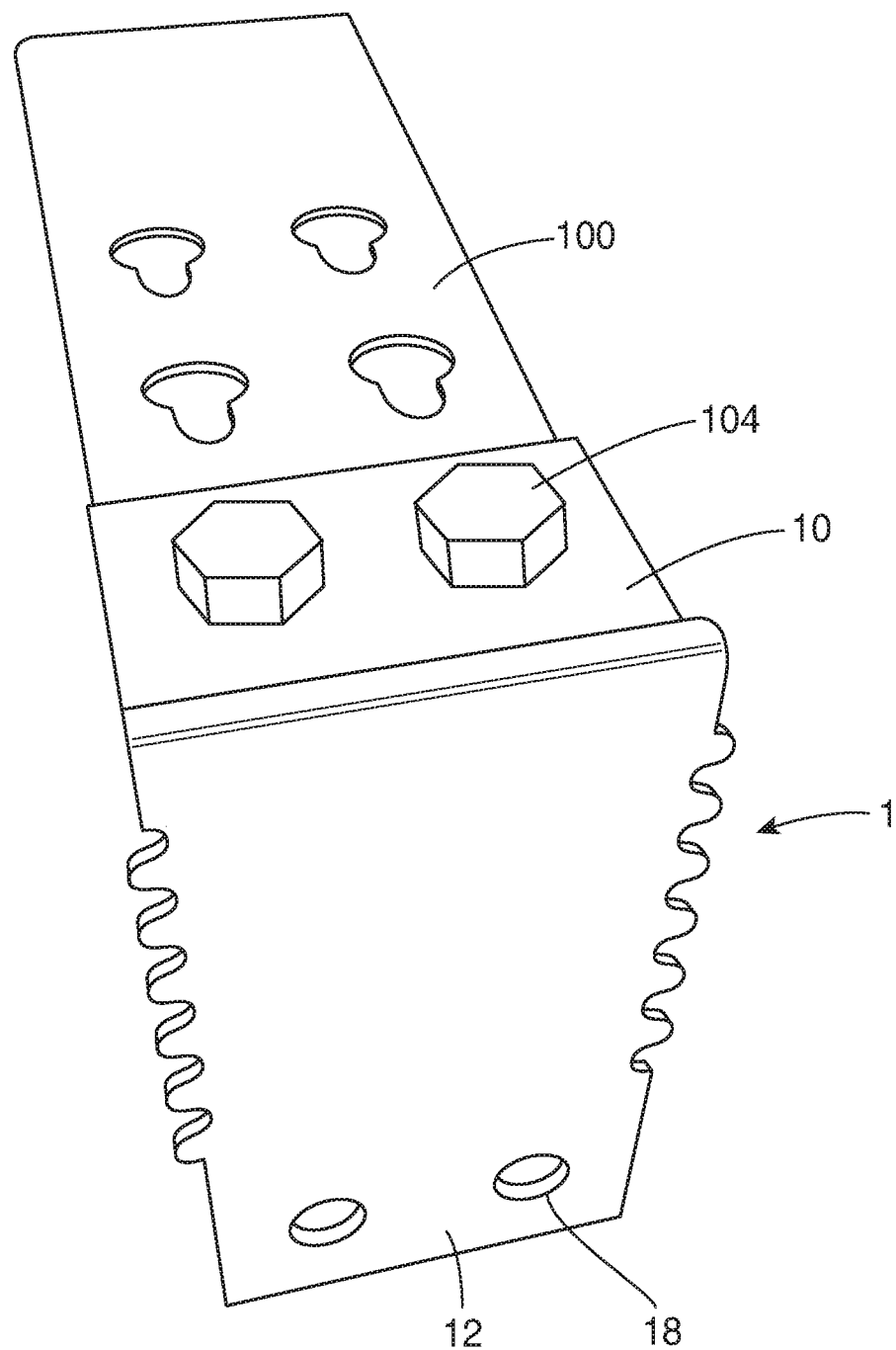
FIG. 3 is a bottom perspective view of an interlocking pallet rack foot plate attached to a pallet rack in accordance with the present invention.
Figure 4:
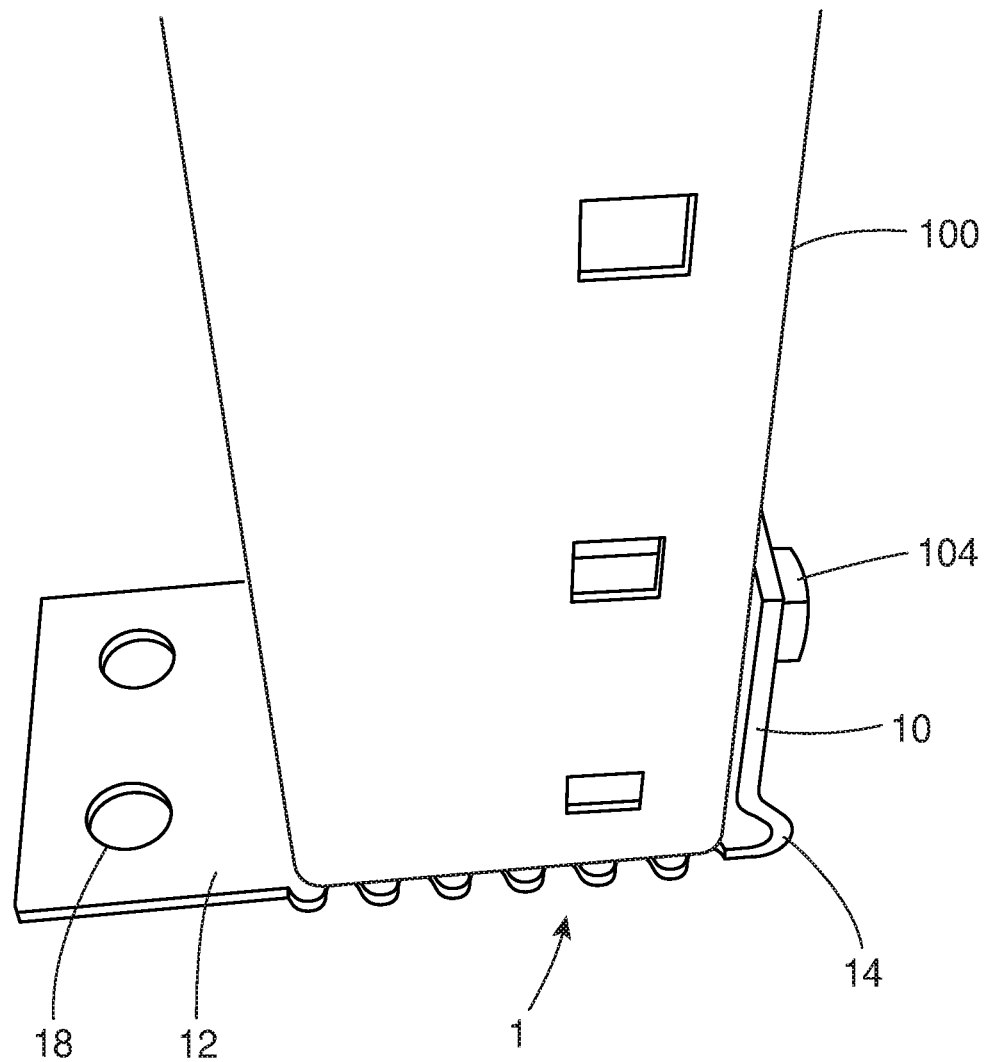
FIG. 4 is an end perspective view of an interlocking pallet rack foot plate attached to a pallet rack in accordance with the present invention.

With reference now to the drawings, and particularly to FIG. 1, there is shown a perspective view of an interlocking pallet rack foot plate 1. With reference to FIGS. 2-4, the The interlocking pallet rack foot plate 1 preferably includes an attachment flange 10, a bottom flange 12 and an offset junction 14. The interlocking pallet rack foot plate 1 is preferably fabricated from a single piece of material. The bottom flange 12 extends from one end of the offset junction flange 14. The attachment flange 10 extends perpendicular from an opposing end of the offset junction 14, relative to the bottom flange 12. The offset junction 14 avoids making contact with a bottom corner 102 of a vertical pillar 100 of a pallet rack. At least one pillar hole 16 is preferably formed through the attachment flange 10, such that the interlocking pallet rack foot plate 1 may be secured to the vertical pillar 100 with at least one pillar fastener 104. However, the attachment flange may also be welded to the vertical pillar, eliminating the need for the at least one pillar hole and the at least one fastener. At least one floor hole 18 is formed through an end of the bottom flange 12, such that the pallet rack may be secured to a warehouse floor with at least one floor fastener (not shown).

Figure 5:
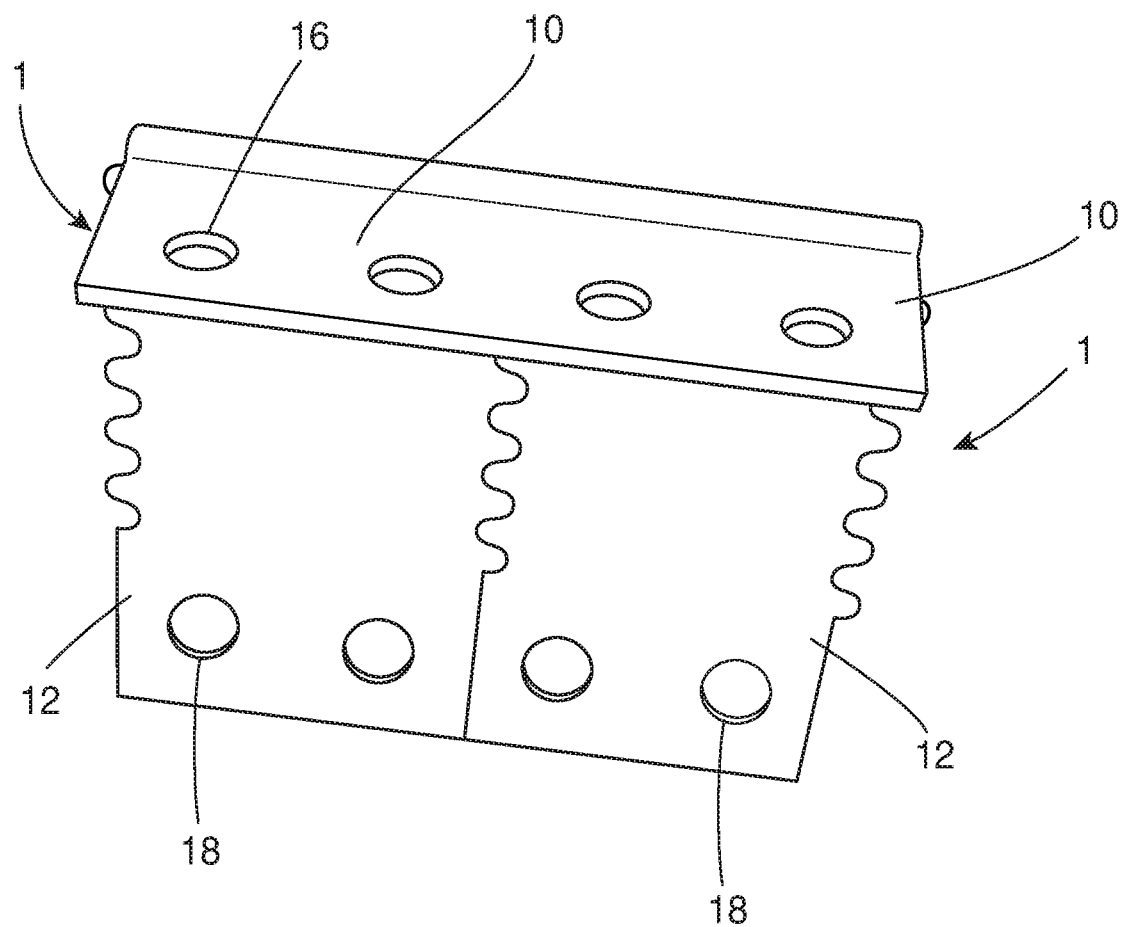
FIG. 5 is a perspective view of two interlocking pallet rack foot plates engaged with each other in accordance with the present invention.
Figure 6:
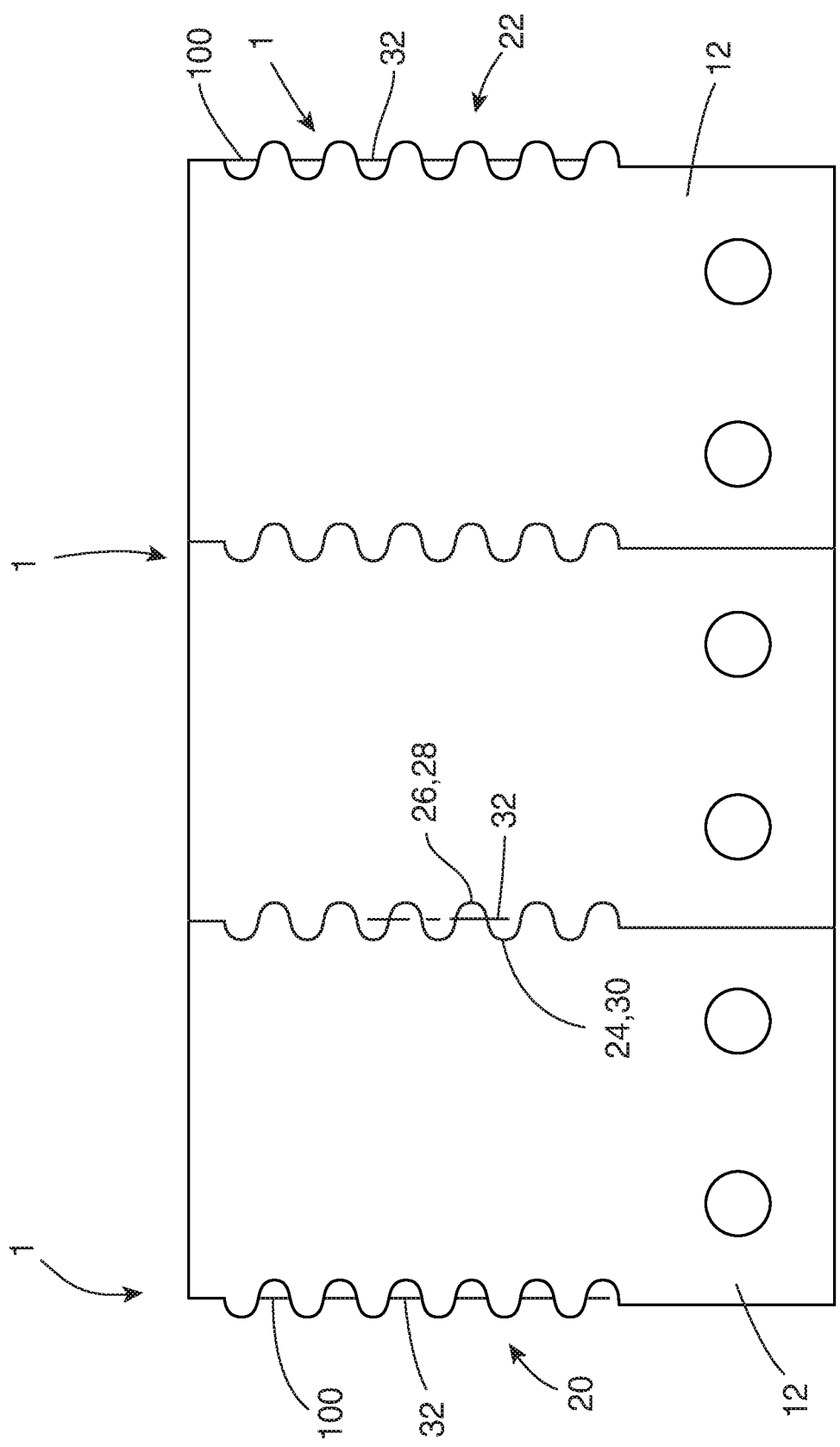
FIG. 6 is an end view of three interlocking pallet rack foot plates engaged with each other in accordance with the present invention.

A first plurality of interlocking projections 20 are formed on one edge of the bottom flange 12 and a second plurality of interlocking projections 22 are formed on an opposing edge of the bottom flange 12. Each first interlocking projection 20 includes a first peak 24 and a first valley 26. Each second interlocking projection 22 includes a second peak 28 and a second valley 30. The first plurality of interlocking projections 20 starts, adjacent the attachment plate 10 with a first peak 24. The second plurality of interlocking projections 22 starts, adjacent the attachment plate with a second valley 30. With reference to FIGS. 5-6, thus two adjacent interlocking pallet rack foot plates 1 will interlock with the edges of the attachment plates 10 and the bottom plates 12 being aligned with each other. Further, a transition line 32 between the plurality of first and second peaks 24, 28 and first and second valleys 26, 30 will be an edge of the vertical pillar 100 on opposing sides of the bottom plate 12. The alignment of the transition line 32 allows a plurality of vertical pillars 100 of the plurality of pallet racks to contact each other when bundled.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An interlocking pallet rack foot plate for attachment to a bottom of a vertical pillar of a pallet rack, comprising:
   a flange having a straight width portion that is configured to be equal to a width of the vertical pillar;
   a first plurality of interlocking projections are formed on one side of said flange, said first plurality of interlocking projections include a plurality of first peaks and first valleys, said plurality of first peaks extend outward from said straight width portion, said plurality of first valleys extend inward from said straight width portion; and
   a second plurality of interlocking projections are formed on an opposing side of said flange, said second plurality of interlocking projections include a plurality of second peaks and second valleys, said plurality of second peaks extend outward from said straight width portion, said plurality of second valleys extend inward from said straight width portion, said first plurality of interlocking projections on a first interlocking plate rack foot plate are sized to receive said second plurality of interlocking projections on a second interlocking pallet rack foot plate.

2. The interlocking pallet rack foot plate of claim 1 wherein:
   said first plurality of interlocking projections include a plurality of first peaks and first valleys; and
   said second plurality of interlocking projections include a plurality of second peaks and second valleys.

3. The interlocking pallet rack foot plate of claim 2 wherein:
   a transition line between said plurality of peaks and said plurality of valleys is a side edge of said flange.

4. The interlocking pallet rack foot plate of claim 1 wherein:
   at least one floor hole is formed through said flange.

5. An interlocking pallet rack foot plate for attachment to a bottom of a vertical pillar of a pallet rack, comprising:
   an attachment flange;
   a bottom flange formed perpendicular to said attachment flange, said bottom flange having a straight width portion that is configured to be equal to a width of the vertical pillar;
   a first plurality of interlocking projections are formed on one side of said bottom flange, said first plurality of interlocking projections include a plurality of first peaks and first valleys, said plurality of first peaks extend outward from said straight width portion, said plurality of first valleys extend inward from said straight width portion; and
   a second plurality of interlocking projections are formed on an opposing side of said bottom flange, said second plurality of interlocking projections include a plurality of second peaks and second valleys, said plurality of second peaks extend outward from said straight width portion, said plurality of second valleys extend inward from said straight width portion, said first plurality of interlocking projections on a first interlocking plate rack foot plate are sized to receive said second plurality of interlocking projections on a second interlocking pallet rack foot plate.

6. The interlocking pallet rack foot plate of claim 5 wherein:
   said first plurality of interlocking projections include a plurality of first peaks and first valleys; and
   said second plurality of interlocking projections include a plurality of second peaks and second valleys.

7. The interlocking pallet rack foot plate of claim 6 wherein:
   a transition line between said plurality of peaks and said plurality of valleys is a side edge of said bottom flange.

8. The interlocking pallet rack foot plate of claim 5 wherein:
   at least one pillar hole is formed through said attachment plate.

9. The interlocking pallet rack foot plate of claim 5 wherein:
   said attachment plate is secured to the vertical pillar by welding.

10. The interlocking pallet rack foot plate of claim 5 wherein:
    at least one floor hole is formed through said bottom flange.

11. An interlocking pallet rack foot plate for attachment to a bottom of a vertical pillar of a pallet rack, a first pallet rack includes a first vertical pillar, a second pallet rack includes a second vertical pillar, comprising:
    an attachment flange;
    a bottom flange formed perpendicular to said attachment flange, said bottom flange having a straight width portion that is configured to be equal to a width of the vertical pillar;
    a first plurality of interlocking projections are formed on one side of said bottom flange, said first plurality of interlocking projections include a plurality of first peaks and first valleys, said plurality of first peaks extend outward from said straight width portion, said plurality of first valleys extend inward from said straight width portion; and
    a second plurality of interlocking projections are formed on an opposing side of said bottom flange, said second plurality of interlocking projections include a plurality of second peaks and second valleys, said plurality of second peaks extend outward from said straight width portion, said plurality of second valleys extend inward from said straight width portion, wherein a first attachment flange is configured to be secured to a bottom of the first vertical pillar, a second attachment flange is configured to be secured to a bottom of the second vertical pillar, the first and second vertical pillars are configured to contact each other.

12. The interlocking pallet rack foot plate of claim 11 wherein:
    said first plurality of interlocking projections include a plurality of first peaks and first valleys; and
    said second plurality of interlocking projections include a plurality of second peaks and second valleys.

13. The interlocking pallet rack foot plate of claim 12 wherein:
    a transition line between said plurality of peaks and said plurality of valleys is a side edge of said bottom flange.

14. The interlocking pallet rack foot plate of claim 11 wherein:
    at least one pillar hole is formed through said attachment plate.

15. The interlocking pallet rack foot plate of claim 11 wherein:

said attachment plate is secured to the vertical pillar by welding.

16. The interlocking pallet rack foot plate of claim 11 wherein:
    at least one floor hole is formed through said bottom flange.

17. The interlocking pallet rack foot plate of claim 11 wherein:
    said bottom flange is joined to said attachment flange with an offset junction.

\* \* \* \* \*